(12) United States Patent
Lemarchand et al.

(10) Patent No.: US 11,506,066 B2
(45) Date of Patent: Nov. 22, 2022

(54) FAN MODULE WITH VARIABLE PITCH BLADES

(71) Applicant: SAFRAN AIRCRAFT ENGINES, Paris (FR)

(72) Inventors: Kevin Morgane Lemarchand, Melun (FR); Gilles Alain Marie Charier, La Grande Paroisse (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 328 days.

(21) Appl. No.: 16/666,158

(22) Filed: Oct. 28, 2019

(65) Prior Publication Data

US 2020/0131917 A1 Apr. 30, 2020

(30) Foreign Application Priority Data

Oct. 30, 2018 (FR) ...................................... 1860023

(51) Int. Cl.
*F01D 7/00* (2006.01)

(52) U.S. Cl.
CPC ............ *F01D 7/00* (2013.01); *F05D 2260/70* (2013.01)

(58) Field of Classification Search
CPC ... F01D 7/00; F01D 25/16; F02C 7/36; F05D 2260/40311; F05D 2260/70
See application file for complete search history.

(56) References Cited

U.S. PATENT DOCUMENTS

| | | | | |
|---|---|---|---|---|
| 3,922,852 A * | 12/1975 | Drabek | ...................... | F01D 7/00 60/226.1 |
| 4,704,862 A * | 11/1987 | Dennison | ................... | F02K 3/06 60/226.2 |
| 8,814,505 B2 * | 8/2014 | Bellis | ....................... | F02C 3/107 415/68 |
| 8,869,504 B1 * | 10/2014 | Schwarz | ................... | F02C 9/18 60/226.1 |

FOREIGN PATENT DOCUMENTS

FR 2248415 A1 5/1975

OTHER PUBLICATIONS

Preliminary Research Report and Written Opinion received for French Application No. 1860023, dated Jul. 9, 2019, 9 pages (1 page of French Translation Cover Sheet and 8 pages of original document).

* cited by examiner

*Primary Examiner* — Brian P Wolcott
*Assistant Examiner* — Sang K Kim
(74) *Attorney, Agent, or Firm* — Womble Bond Dickinson (US) LLP

(57) ABSTRACT

A fan module with variable pitch blades for a longitudinal axis propulsion assembly. The module includes a rotor through which a rotor shaft runs along the longitudinal axis X and carries the blades of the fan. A system for changing the pitch of the blades includes a mechanism connected to the blades of the fan and a controller acting on the mechanism. The controller has a fixed body and a movable body translatable along the longitudinal axis X relative to the fixed body, and a load transfer bearing arranged between the mechanism and the controller. The fan module includes a power shaft driving the rotor shaft via an epicyclic train speed reducer, the speed reducer including a sun gear connected to the power shaft and a satellite carrier including a fixed annular ferrule secured to a fixed casing. The fixed body of the controller is mounted on the annular ferrule.

11 Claims, 2 Drawing Sheets

FAN MODULE WITH VARIABLE PITCH BLADES

1. FIELD OF THE INVENTION

The present invention concerns the field of turbomachines. In particular, it concerns a fan module with variable pitch blades for a propulsion assembly.

2. BACKGROUND

A fan equipped with variable pitch blades allows the blade pitch to be adjusted, and more precisely the blade pitch angle according to flight parameters in order to optimize the operation of the fan. In general, this configuration makes it possible to optimize the propulsion assembly in which such a fan is integrated. As a reminder, the pitch angle of a blade corresponds to the angle, in a longitudinal plane perpendicular to the axis of rotation of the blade, between the edge of the blade and the plane of rotation of the fan. The variable pitch blades can occupy a so-called reverse thrust position in which they generate a counter thrust to help slow the aircraft and a feathering position in which, in the event of failure or breakdown, they limit their resistance. Examples of such fans are described in patent documents FR-A1-2 248 415 and U.S. Pat. No. 4,704,862.

The variable pitch fans, particularly in the case of enclosed fans, also significantly reduce the surface area of the nacelle and thus the drag of the propulsion assembly. Indeed, the increase in the dilution rate over the past few years has affected the diameter of the turbomachine, which is constrained by a minimum ground clearance to be respected due to the integration of the turbomachine, most often under the wing of an aircraft. The increase in the dilution rate is carried out in particular and in priority on the diameter of the fan, which can reduce the compression rate of the fan and lead to a change in its operability. The blade pitch setting therefore makes it possible to address these constraints. This also avoids modifying the external exterior surface of the nacelle to incorporate thrust reversers therein that affect the drag.

It is known from the patent application FR1754381 a fan module 1 with such a fan 2 with variable pitch blades. The fan module comprises a system 22 for changing the pitch of the blades comprising a control means 23 acting on connecting means 34 connected to the bottoms 18 of the blades of the fan and a load transfer bearing 28 which is mounted between the control means 23 and the bottoms 28 of the blades. The system 22 for changing the pitch of the blades is installed in an annular space 14 formed between the rotor shaft 10 of the fan and an annular ferrule 11 secured to one end of the rotor shaft. This annular ferrule 11 at least partially surrounds the system 22 for changing the pitch.

However, the configuration of a system for changing the pitch as described above remains cumbersome since the annular ferrule 11 secured upstream to the rotor shaft bypasses at least the control means 23 and slightly lengthens the length of the rotor shaft 10. In addition, the radial annular space available under the pivot axis of the blade for integration of the system for changing the pitch still requires a high hub ratio.

3. OBJECTIVE OF THE INVENTION

One of the objectives of this invention is to provide a fan module that reduces radial space requirements and hub ratio while avoiding major structural modifications.

4. SUMMARY OF THE INVENTION

This objective is achieved in accordance with the invention by means of a fan module with variable pitch blades for a longitudinal axis propulsion assembly, said fan module comprising:
- a rotor comprising a rotor shaft along the longitudinal axis and carrying the blades of the fan,
- a system for changing the pitch of the blades comprising connecting means connected to the blades of the fan and a control means acting on the connecting means, the control means comprising a fixed body and a movable body translatable along the longitudinal axis relative to said fixed body,
- a load transfer bearing arranged between the connecting means and the control means, the fan module comprising a power shaft driving the rotor shaft via an epicyclic train speed reducer, the speed reducer comprising a sun gear connected to the power shaft and a satellite carrier comprising a fixed annular ferrule secured to a fixed casing, the fixed body of the control means being mounted on said annular ferrule.

Thus, this solution makes it possible to achieve the above-mentioned objective. In particular, the architecture of the speed reducer with the fixed satellite carrier provides a fixed structure to support the fixed body of the control means in the annular space of the fan rotor. In other words, the fixed support of the control means passes through the satellite carrier. As the fan rotor shaft (and the annular ferrule secured thereto) no longer encircles the system for changing the pitch, the axial and radial dimensions are reduced. Reducing the radial dimension also affects the reduction of the fan hub ratio. This hub ratio is the quotient between the diameter at the inner radial end of the fan blades measured at the leading edge of the fan blade and the diameter at the outer radial end of the blades measured at the leading edge of the blades. The overhang due to the length of the fan rotor shaft in the prior art is also reduced due to the axial shortening of the rotor shaft. In addition, this configuration does not require a pipe system, known as OTB (Oil Transfer Bearing), to route lubricant from a fixed marker (power source of the turbomachine) to the rotating system (the system for changing the pitch) that can cause leaks and additional unbalance.

According to a characteristic of the invention, the control means is installed radially at least partially inside the rotor shaft of the fan, in particular along a pivot axis of the blades. This configuration contributes to reducing in particular the radial dimension.

According to a characteristic of the invention, the load transfer bearing is mounted on the movable body of the control means and cooperates with the connecting means.

According to a characteristic of the invention, the speed reducer comprises an outer ring gear coupled to the fan rotor shaft. This configuration facilitates the integration of the system for changing the pitch and in particular the control means radially inside the fan rotor shaft.

Following yet another characteristic, at least one inner bearing is arranged between the fixed annular ferrule of the satellite carrier and the rotor shaft of the fan.

According to another characteristic, the satellite carrier carries satellites, each rotating about an axis substantially parallel to the longitudinal axis X.

According to another characteristic, each satellite meshes with the sun gear and the outer ring gear.

Following yet another characteristic, a first and a second bearings are mounted between a support ring gear secured to the fixed casing and the rotor shaft of the fan.

According to another characteristic, the load transfer bearing comprises an inner ring, an outer ring and a double row ball bearing mounted between the inner ring and the outer ring, the inner ring being connected to an inner ferrule secured to the movable body and the outer ring being connected to an outer ferrule connected to the connecting means.

According to an embodiment of the invention, the connecting means comprise connecting rods each with a first end articulated with a clevis of the outer ferrule and a second end articulated with a crank pin of the blade bottom.

According to another embodiment of the invention, the connecting means comprise spherical joints each arranged in a recess of a ring secured to the outer ferrule of the load transfer bearing and fingers each connected to one of the spherical joints, each finger being secured to a crank pin of the blade bottom. Such a configuration further reduces the radial dimension, which affects the hub ratio of the fan. Indeed, these rods replace the spherical-finger joint connection, the finger occupying a radial space that is eliminated in this configuration.

Following yet another characteristic, the fan module comprises at least one connecting member connecting the outer ferrule to the fan rotor. This connecting member helps to suspend the system for changing the pitch within the fan rotor.

The invention also concerns a turbomachine comprising at least one fan module having any of the above-mentioned characteristics.

5. BRIEF DESCRIPTION OF THE FIGURES

The invention will be better understood, and other purposes, details, characteristics and advantages of the invention will become clearer when reading the detailed explanatory description that follows, of the embodiments of the invention given as purely illustrative and non-limitative examples, with reference to the attached schematic drawings in which.

6. DESCRIPTION OF EMBODIMENTS OF THE INVENTION

Figure 1:
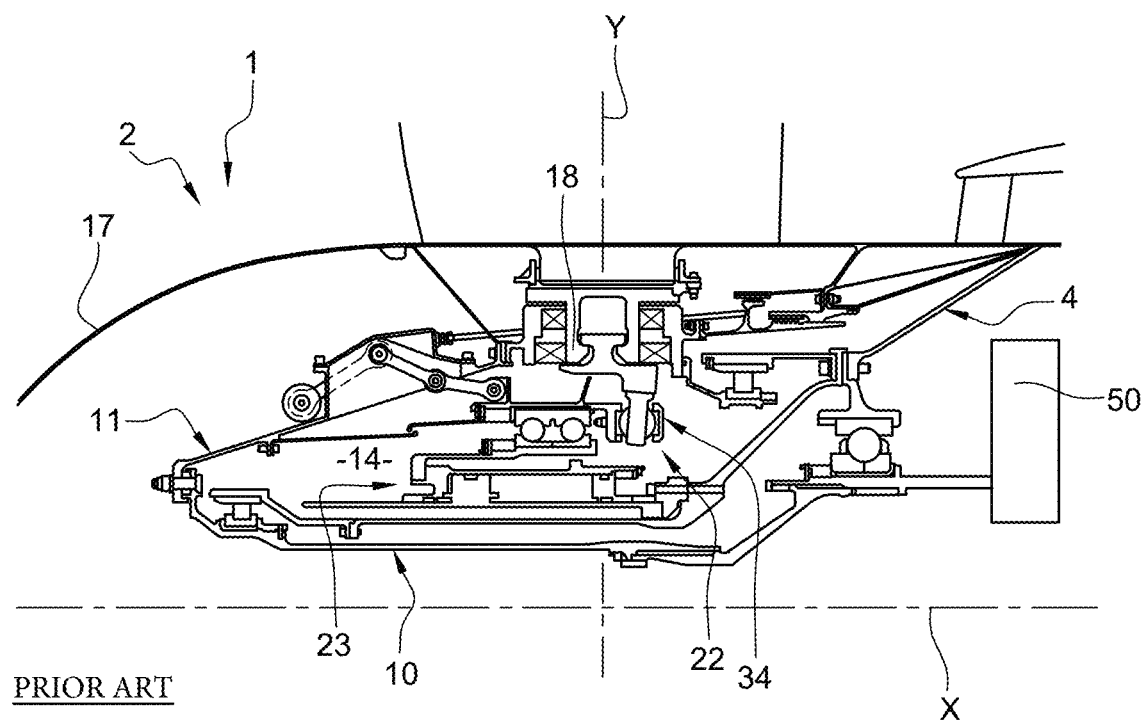
FIG. 1 shows an axial section of a fan module from the prior art.

FIG. 1 shows a fan module of a turbomachine intended to be mounted on an aircraft. This turbomachine is a dual-flow turbomachine that extends along a longitudinal axis X. The corresponding numerical references of the elements of this turbomachine described above are kept in the description below.

Figure 2:
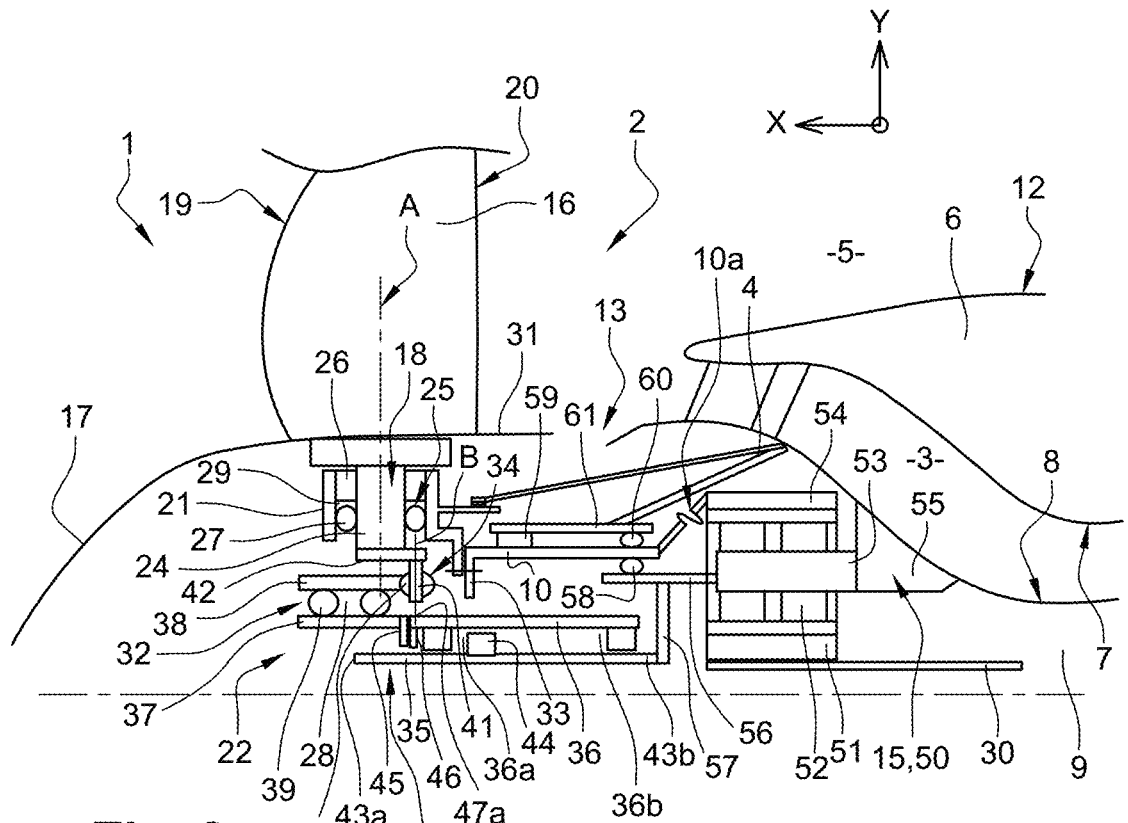
FIG. 2 shows schematically following an axial section a first embodiment of a fan module according to the invention.

With reference to FIG. 2, the dual-flow turbomachine generally comprises an external nacelle (not shown) surrounding a gas generator (not shown), upstream of which is mounted a fan 2. In this invention, and in general, the terms "upstream" and "downstream" are defined in relation to the flow of the gases in the turbomachine which is substantially parallel to the longitudinal axis X. Similarly, the terms "inner", "external", "above", "below" and "radial" are defined with respect to the radial axis Y perpendicular to the longitudinal axis X and with respect to the distance from the longitudinal axis X. The gas generator comprises, for example, from upstream to downstream, a low-pressure compressor, a high-pressure compressor, a combustion chamber, a high-pressure turbine and a low-pressure turbine.

The fan 2 is enclosed here by a fan casing (not shown) secured to the nacelle. The fan 2 compresses the air entering the turbomachine which is divided into a hot flow or primary flow flowing through an annular primary vein 3 which passes through the gas generator and a cold flow or secondary flow flowing through an annular secondary vein 5 around the gas generator. In particular, the primary vein 3 and the secondary vein 5 are separated by an annular intervein casing 6 surrounding the gas generator. The intervein casing 6 comprises a radially inner wall 7 which delimits with an outer annular surface 8 of an inner casing 9, the primary vein 3. The intervein casing 6 also includes a radially outer wall 12 delimiting the secondary vein 5 with an inner annular surface (not shown) of the nacelle.

The fan module 1 comprises a fan rotor 13 through which a fan rotor shaft 10 is passed which is centred on the longitudinal axis X. The fan rotor 13 is surrounded by an inlet cone 17 which is arranged upstream of the inner casing 9. The inner casing 9 is fixed with respect to the fan rotor 13. The rotor shaft 10 is driven in rotation by a power shaft 30 of the turbomachine via a power transmission mechanism 15 to reduce the rotational speed of the fan 2. This power shaft 30 is a low-pressure turbine shaft that connects the low-pressure compressor and the low-pressure turbine to form a low-pressure body. Similarly, a high pressure shaft (not shown) connects the high pressure compressor and the high pressure turbine to form a high pressure body. Alternatively, the power shaft is a power turbine shaft independent of the gas generator. The power transmission mechanism 15 allows the arrangement of a fan with a large diameter, which results in an increase in the dilution ratio. In this example, the dilution rate of the fan is greater than 10. Preferably, the dilution rate is between 15 and 20.

The fan rotor 13 also carries a series of variable pitch blades 16. These blades 16 extend radially outwards and are delimited by the fan casing. Each fan blade 16 has an upstream leading edge 19, and a downstream trailing edge 20, axially opposite each other, (along the longitudinal axis X). The rotor 13 also includes a support ring 21 of the blades 16 centred on the longitudinal axis X and provided with radial cylindrical housings 29 regularly distributed over its periphery. The fan blades 16 each comprise a bottom 18 received pivoting along a pivot axis A parallel to the radial axis Y in one of the cylindrical housings 29. In particular, each blade bottom 18 is in the form of a bulb-shaped fastener which is secured to a pivot 24 which is mounted in the cylindrical housing 29. Each bottom 18 pivots in a cylindrical housing 29 by means of roller bearings 25. In this example, two rolling bearings are mounted in the cylindrical housing 2. These bearings are mounted one above the other along the radial axis. The rolling elements of these two bearings 25 comprise rollers 26 and balls 27 respectively. The rollers 26 are arranged radially above the balls 27. As shown in FIG. 1, the bottom 18 of the blades are covered by an outer annular envelope 31 which is centred on the longitudinal axis X and has a substantially circular cross-section. This outer envelope 31 extends the fan inlet cone 17 downstream and ensures aerodynamic continuity with the cone 17.

The fan module 1 comprise a system 22 for changing the pitch of the blades of the blades of the fan 2 allowing to vary the pitch of the blades around their radial pivot axes A so that they can have different angular positions according to the operating conditions of the turbomachine and the flight phases involved. For this purpose, the system 22 for changing the pitch comprises connecting means 34 connected to the fan blades 16 and a control means 23 acting on the connecting means 34. The system 22 for changing the pitch comprises also a load transfer module 32 equipped with a load transfer bearing 28 known as LTB (Load Transfer Bearing). This load transfer bearing 28 is installed between the connecting means 34 and the control means 23 so as to ensure the transmission of forces from the control means 23 to the connecting means 34.

The control means 23 comprises a linear annular actuator with an axis coaxial to the longitudinal axis X. The linear actuator comprises a fixed body 35 and a movable body 36 in translation with respect to the fixed body 35 along the longitudinal axis X. Preferably, but not limited to, the actuator is hydraulic. The movement of the movable body 36 along the longitudinal axis causes the movement of the connecting means 34, via the load transfer module 32, in such a way that it causes the fan blades 16 to pivot about the pivot axis A and thus the pitching of the blades 16. The load transfer bearing 28 is a rolling bearing comprising an inner ring secured to an inner annular ferrule 37 and an outer ring secured to an outer annular ferrule 38. The inner annular ferrule 37 is secured to the movable body 36 while the outer annular ferrule 38 is secured to the connecting means 34. The inner ring ferrule 37 comprises a first radial annular flange 45 which is fixed on a second radial annular flange 46 carried by the movable body 36. The second radial annular flange 46 is located more precisely at an upstream end 47a of the movable body 36. The outer diameter of the outer ferrule 37 is approximately the same as that of the movable body 36. The bearing of the load transfer bearing 28 includes rolling elements 39 which are guided in tracks formed in the inner and outer rings. The rolling elements 39 are formed here by two rows of balls which can be of the oblique contact type oriented in opposite directions in order to optimize the transmission of axial forces.

As shown in FIG. 2, the connecting means 34 comprise for each blade 16 a spherical joint 40 and a finger 41 cooperating with this spherical joint 40. More precisely, the finger 41 extends substantially radially from a crank pin 42 which is provided transversely to the free end of the pivot 24 of each blade 16 bottom 18. Each spherical joint 40 is arranged in a ring (not shown) which is supported by the outer ring ferrule 38 of the load transfer module 32. The spherical joint 40 comprises a sphere defining a radial contact ball joint. The sphere has a hole passing through it on either side along an axis B which is parallel to the radial axis. The ring, centred on the longitudinal axis X, comprises a plurality of recesses distributed over its periphery. Each recess encloses a sphere. Each of the fingers 41 crosses the hole of a sphere along an axis B substantially parallel to the radial axis Y. The fingers 41 are mounted freely in rotation and translation in the hole of the corresponding sphere according to the axis B. The axis B is offset from the axis A of rotation of the blade 16. Alternatively, the crank pin 42 comprises a stub extending in a direction substantially opposite to the finger 41 and coupled in rotation, for example by splines, with the pivot of the corresponding blade. The crank pin 42 allows to multiply the force necessary to adjust the setting of the corresponding blade.

The load transfer bearing 28 transforms the translational movement of the movable body 36 into a translational and rotational movement of the finger 41 connected to the pivot 24 of the bottom of the blades 16 of the fan 2. In this way, all the blades 16 rotate simultaneously to adopt at least two positions known as thrust reverse and feathering.

More precisely, the fixed body 35 extends along the longitudinal axis. This comprises a radial wall 44 delimiting two chambers 36a, 36b with variable volume in the movable body 36 and which are axially opposed. The chambers 36a, 36b are intended to receive a fluid, for example hydraulic under pressure, from a fluid supply source so that the movable body 36 occupies at least two positions. These positions correspond respectively to the thrust reverse position and the feathering position of the fan blades. In particular, in the thrust reverse position, the blades of the fan participate in the braking of the aircraft, in the same way as the conventional thrust reversers. In the feathering position, the blades 16 are then erased as best as possible in relation to the aircraft's direction of advance, for example in the event of a failure of the turbomachine, thus limiting the drag. In the latter position, the blade pitch angle is positive, and is generally in the order of 90°.

The power transmission mechanism 15 comprises a speed reducer 50 formed by a gear train. Preferably the gear train is epicyclic. In particular, the speed reducer 50 comprises a sun gear 51, satellites 52, a satellite carrier 53 and an outer ring gear 54. In this example, the sun gear 51 is centred on the longitudinal axis X and is secured in rotation with the power shaft 30 along the longitudinal axis X. The satellites 52 are carried by the satellite carrier 53 and each rotate about an axis substantially parallel to the longitudinal axis X. Each of the satellites 52 meshes with the sun gear 51 and the outer ring gear 54. The latter is coupled with the rotor shaft 10 of the fan and is secured in rotation with the rotor shaft along the longitudinal axis X.

In other words, the sun gear 51 is the input of the speed reducer 50 and the outer ring gear 54 is the output of the speed reducer 50. The satellite carrier 53 is fixed in relation to the outer ring gear 54 and the sun gear 51. As shown in FIG. 2, the satellite carrier 53 is rigidly connected to a stator plate 55 of the fixed casing 4. The latter is itself rigidly connected to the fixed inner casing 9 of the turbomachine. Advantageously, but not limited to, the reduction rate of the speed reducer is between 3 and 4.

The rotor shaft 10 of the fan drives the support ring 21 of the blades 16. For this purpose, the rotor shaft 10 comprises a substantially radially extending flange 33 which is secured to the support ring 21. Here, the flange 33 extends towards the inside of the turbomachine, i.e. towards the longitudinal axis X.

In this example, the system 22 for changing the pitch is located radially at least partially inside the rotor shaft 10 of the fan 2. In particular, the control means 23 with the movable body 36 and the fixed body 35 extend at least partially axially inside the rotor shaft 10 with respect to the radial axis which allows the reduction of the radial dimension. The fixed body 35 comprises a first upstream end 43a and a second downstream end 43b axially opposed. The first downstream end 43b is located inside the rotor shaft 10 while the upstream end 43a is outside the rotor shaft 10. Here, the rotor shaft 10 has a shorter axial length than the fixed body. As also shown schematically in FIG. 2, the rotor shaft 10 comprises a flexibility 10a between the outer ring gear 54 and the rotor shaft 10 of the fan. This flexibility allows to prevent the outer ring gear 54 from being deformed and moved by the rotor 10. The speed reducer 50 is therefore isolated from movements due to possible unbalances in the fan module.

According to the embodiment shown, the satellite carrier 53 comprises a fixed annular ferrule 56 on which the fixed body 35 of the control means 23, in this case the actuator, is mounted. More precisely, this annular ferrule 56 extends upstream of the speed reducer 50 along the longitudinal axis X. The annular ferrule 56 is centred on the longitudinal axis X. In this example, the annular ferrule 56 includes an annular skirt 57 extending substantially radially towards the longitudinal axis X (towards the inside of the turbomachine). The fixed body 35 is secured to the annular skirt 57 at its second downstream end 43*b*. The annular skirt 57 is arranged upstream of the speed reducer 50. Alternatively, the fixed body 35 comprises this annular skirt 57 which is fixed on the annular ferrule 56. An inner bearing 58 is arranged between the annular ferrule 56 of the satellite carrier 53 and the fan rotor shaft 10 so as to take up the counter thrust force of the linear actuator. The counter thrust force is taken up by the bearings 25 which are installed in the cylindrical housings 29 of the support ring 21. The inner bearing 58 is a rolling bearing, centred on the longitudinal axis X. This inner bearing 58 comprises in particular an inner ring (not shown) carried by the annular ferrule 56 and an outer ring (not shown) carried by the fan rotor shaft 10. In particular, the outer ring is rotating (because it is mounted on the rotating rotor shaft) and the inner ring is fixed (because it is mounted on the annular ferrule of the satellite carrier which is fixed). The inner bearing 58 is located upstream of the speed reducer 50. The inner and outer rings define a track for rolling elements, in this case balls. These balls are in radial contact with the inner and outer rings of the inner bearing 58. The latter is thus able to support radial and axial loads. In this example, the annular skirt 57 is located axially downstream of the inner bearing 58. A first bearing 59 and a second bearing 60 (which can be qualified as fan bearings because they support the rotor shaft 10) are also arranged between the rotor shaft 10 and a fixed support ring gear 61, centred on the longitudinal axis X, and secured to the fixed casing 4. One of these first and second bearings 59, 60 makes it possible to carry out an axial stop of the rotor shaft in order to transmit the propulsive force released by the fan 2 to the casings and suspensions of the turbomachine and finally to the aircraft. The first and second bearings 59, 60 each comprise an inner ring (not shown) which is carried by the fan rotor shaft 10 and a second ring (not shown) which is carried by the support ring gear 61. Here, the rolling elements guided between the inner and outer rings of the first bearing 59 are rollers. Conversely, the rolling elements guided between the inner and outer rings of the second bearing 60 are here balls. In this example, it is the second ball bearing 60 that allows axial forces to be resumed. The first bearing 59 is arranged upstream of the second bearing 60. The latter is arranged upstream of the speed reducer 50. The second bearing 60 is also located radially above the inner bearing 58. In this embodiment described, the hub ratio of the fan module is between 0.25 and 0.35.

Figure 3:
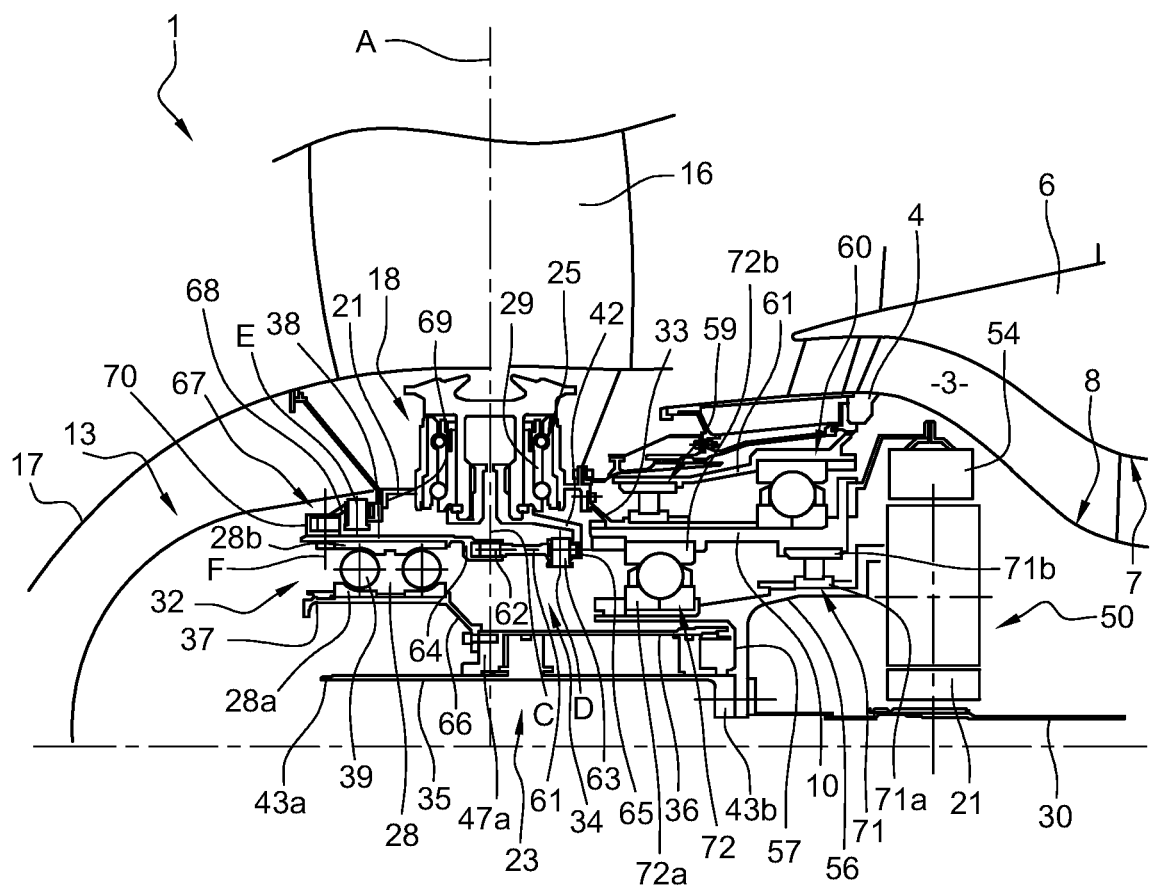
FIG. 3 schematically illustrates following an axial section a second embodiment of a fan module according to the invention.

FIG. 3 shows a second embodiment of a fan module according to the invention. The elements described above and identical in the rest of this description have the same numerical references. This embodiment differs from the previous embodiment on the one hand, by the connecting means 34 and on the other hand, by the arrangement of the various bearings within the module. The connecting means 34 here include a set of first articulated connecting rods 61 which are distributed evenly around the actuator. There are as many first rods as there are blades 16. Each of the first connecting rods 61 is connected, on the one hand, to a crank pin 42 of a blade bottom 18, and on the other hand to the external ferrule 38 of the load transfer module 32. The first connecting rods 61 each have a first end 62 which is articulated along an axis C in a first clevis 64 of the outer ferrule 38 of the load transfer module 32. This axis C is substantially parallel to the radial axis Y. The first rods 61 also include a second end 63, opposite the first end 62, which is articulated along an axis D, substantially parallel to the axis Y, within a fork 65 carried by the crank pin 42 of the blade bottom. These first connecting rods 61 allow the load transfer module 32 to be shifted axially with respect to the linear actuator, thus reducing the radial space requirement. For this purpose, the inner ferrule 37 of the load transfer module 32 comprises an end shield 66 which is fixed on the upstream end 47*a* of the movable body 36 of the linear actuator. This end shield 66 has a substantially frustoconical wall that widens upstream (from the upstream end 47*a* of the movable body 36) so as to shift the load transfer module 32 axially and radially outwards.

As shown in FIG. 3, at least one connecting member 67 connects the outer ferrule 38 of the load transfer module 32 to the fan rotor. The load transfer bearing 28 of the load transfer module 32 comprises an inner ring 28*a* secured to the inner annular ferrule 37 and an outer ring 28*b* secured to the outer annular ferrule 38. Advantageously, but in a non-limiting manner, the connecting member 67 comprises two radially opposite second connecting rods 68. Each second connecting rod 68 has a first end that is articulated along an axis E to a clevis of a tab 69 clamped on the fan rotor. A second end of each second rod 68 is articulated along an axis F in a second clevis 70 secured to the external ferrule 38. This second clevis 70 is substantially axially opposed to the first clevis 64 where the first connecting rods 61 are connected. The axes E, F are substantially parallel to the radial axis Y. In this example, a first and a second inner bearing 71, 72 are arranged between the annular ferrule 56 and the rotor shaft 10 of the fan. As for the only inner bearing 58 of the previous embodiment between the annular ferrule 56 and the rotor shaft 10, each first and second inner bearing 71, 72 comprises an inner ring 71*a*, 72*a* carried by the annular ferrule 56 and an external ring 71*b*, 72*b*, carried by the fan rotor shaft 10. The outer rings 71*b*, 72*b* are rotating because these are mounted on the rotor shaft 10. The inner rings 71*a*, 72*a* are fixed because they are mounted on the annular ferrule 56 of the satellite carrier which is fixed. The rolling elements of the first inner bearing are rollers while the rolling elements of the second inner bearing 72 are balls. The second inner bearing 72 is arranged upstream of the first inner bearing 71. Similarly, the second inner bearing 72 has an outer diameter that is larger than the outer diameter of the first inner bearing 71. The annular skirt 57 extends axially between the first and second inner bearings 71, 72. For the first and second bearings arranged 59, 60 between the support ring gear 61 and the rotor shaft 10, the diameter of the second bearing 60 is larger than that of the first bearing 59.

The bearings 25 between the fan rotor shaft 10 and the fixed annular support ring 21, and between the fan rotor shaft and each blade are arranged in a manner substantially identical to that of the first embodiment. In particular, the bearings 25 are also arranged in the cylindrical housing 29 to allow the rotation of each bottom 18. The bearings 25 are also two here. The rolling elements of these bearings 25 comprise balls. The outer diameter of the bearing located radially inside each of the cylindrical housings 29 is greater than the outer diameter of the bearing located radially above.

Similarly, in this embodiment, the hub ratio of the fan module is between 0.25 and 0.35.

The invention claimed is:

1. A fan module with variable pitch blades for a longitudinal axis propulsion assembly, said fan module comprising:
   a rotor comprising a rotor shaft along the longitudinal axis X and carrying the blades of the fan,
   a system for changing the pitch of the blades comprising connecting means connected to the blades of the fan and a control means acting on the connecting means, the control means comprising a fixed body and a movable body translatable along the longitudinal axis X relative to said fixed body, and
   a load transfer bearing arranged between the connecting means and the control means
   wherein said fan module comprises a power shaft driving the rotor shaft via an epicyclic train speed reducer, the speed reducer comprising a sun gear connected to the power shaft and a satellite carrier comprising a fixed annular ferrule secured to a fixed casing, the fixed body of the control means being mounted on said annular ferrule.

2. The fan module according to claim 1, wherein the control means is installed radially at least in part inside the rotor shaft of the fan, in particular along a pivot axis of the blades.

3. The fan module according to claim 1, wherein the load transfer bearing is mounted on the movable body (36) and cooperates with the connecting means.

4. The fan module according to claim 1, wherein the speed reducer comprises an outer ring gear coupled to the rotor shaft of the fan.

5. The fan module according to claim 1, wherein at least one inner bearing is arranged between the fixed annular ferrule of the satellite carrier and the rotor shaft of the fan.

6. The fan module according to claim 1, wherein a first and a second bearings are mounted between a support ring gear secured to the fixed casing and the rotor shaft of the fan.

7. The fan module according to claim 1, wherein the load transfer bearing comprises an inner ring, an outer ring and a double row ball bearing mounted between the inner ring and the outer ring, the inner ring being connected to an inner ferrule secured to the movable body and the outer ring being connected to an outer ferrule connected to the connecting means.

8. The fan module according to claim 7, wherein the connecting means comprise connecting rods each with a first end articulated with a clevis of the outer ferrule and a second end articulated with a crank pin of the blade bottom.

9. The fan module according to claim 7, wherein the connecting means comprise spherical joints each arranged in a recess of a ring secured to the outer ferrule of the load transfer bearing and fingers each connected to one of the spherical joints, each finger being secured to a crank pin of the blade bottom.

10. The fan module according to claim 8, wherein the fan module comprises at least one connector connecting the outer ferrule to the fan rotor.

11. A fan module with variable pitch blades for a longitudinal axis propulsion assembly, said fan module comprising:
   a rotor comprising a rotor shaft along the longitudinal axis X and carrying the blades of the fan,
   a system for changing the pitch of the blades comprising connecting means connected to the blades of the fan and a control means acting on the connecting means, the control means comprising a fixed body and a movable body translatable along the longitudinal axis X relative to said fixed body, and
   a load transfer bearing arranged between the connecting means and the control means
   wherein fan module comprises a power shaft driving the rotor shaft via an epicyclic train speed reducer, the speed reducer comprising a sun gear connected to the power shaft and a satellite carrier comprising a fixed annular ferrule secured to a fixed casing, the fixed body of the control means being mounted on said annular ferrule,
   wherein the connecting means comprise spherical joints each arranged in a recess of a ring secured to the outer ferrule of the load transfer bearing and fingers each connected to one of the spherical joints, each finger being secured to a crank pin of the blade bottom.

* * * * *